US007404092B2

(12) United States Patent
Kasprzak et al.

(10) Patent No.: US 7,404,092 B2
(45) Date of Patent: Jul. 22, 2008

(54) POWER SUPPLY CONTROL IN A SERVER SYSTEM

(75) Inventors: Keith J. Kasprzak, Cedar Park, TX (US); Chih-Hsiung Huang, Taoyuan Hsien (TW)

(73) Assignee: Dell Products L.P., Round Rock, TX (US)

( * ) Notice: Subject to any disclaimer, the term of this patent is extended or adjusted under 35 U.S.C. 154(b) by 387 days.

(21) Appl. No.: 11/112,497

(22) Filed: Apr. 22, 2005

(65) Prior Publication Data

US 2006/0242462 A1 Oct. 26, 2006

(51) Int. Cl.
*G06F 1/00* (2006.01)
*G06F 11/30* (2006.01)
*G11C 5/14* (2006.01)

(52) U.S. Cl. ........................ 713/300; 713/340; 365/227

(58) Field of Classification Search ................. 713/300, 713/310, 340
See application file for complete search history.

(56) References Cited

U.S. PATENT DOCUMENTS 5,278,654 A 1/1994 Yang .......................... 358/190
5,652,893 A * 7/1997 Ben-Meir et al. ........... 713/310
6,587,953 B1 7/2003 Torikai ....................... 713/330
6,701,611 B1 3/2004 Izumida et al. ............... 29/832
6,968,470 B2 * 11/2005 Larson et al. ............... 713/340
7,131,019 B2 * 10/2006 Lee ........................... 713/340
2002/0140400 A1 10/2002 Hatori et al. ................ 320/130
2003/0135726 A1 7/2003 Hagiwara et al. .............. 713/1
2004/0029527 A1 2/2004 Endo ......................... 455/11.1
2004/0105285 A1 6/2004 Tanaka et al. ................. 363/73

FOREIGN PATENT DOCUMENTS

JP 11143853 A * 5/1999

* cited by examiner

*Primary Examiner*—Suresh K Suryawanshi
(74) *Attorney, Agent, or Firm*—Baker Botts L.L.P.

(57) ABSTRACT

An information handling system comprising at least one power supply unit (PSU), at least one blade server module (BSM) and at least one module monitor board (MMB). The at least one PSU, at least one BSM and the at least one MMB may be removable from the information handling system. The at least one PSU may store in a memory device, e.g., $I^2C$ device, the most recent power control command and will thereby maintain that most recent power control command when all of the at least one MMBs are removed from or operationally fail in the information handling system.

32 Claims, 5 Drawing Sheets

POWER SUPPLY CONTROL IN A SERVER SYSTEM

TECHNICAL FIELD

The present invention relates generally to information handling systems and, more particularly, to controlling power supplies in the information handling system.

BACKGROUND

As the value and use of information continues to increase, individuals and businesses seek additional ways to process and store information. One option available to users are information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

An information handling system is powered from a power supply system that receives and converts alternating current (AC) power to direct current (DC) power at utilization voltages required by the electronic modules comprising the information handling system. The power supply system tightly regulates these utilization voltages and incorporates over current protection for each of the voltages. To further provide increased reliability of the power supply system, a plurality of power supply units (PSUs) may be provided and coupled in parallel so that the loss or malfunction of one or more of the PSUs will not totally disable operation of the information handling system.

Blade server modules, or "blades," are miniaturized server modules that typically are powered from a common power supply system and are cooled by a cooling system within a multi-server cabinet. Typically, a blade includes a circuit board with one or more processors, memory, a connection port, and possibly a disk drive for storage. By arranging a plurality of blades like books on a shelf in the multi-server cabinet, a high density multi-server system achieves significant cost and space savings over a plurality of conventional servers. These savings result directly from the sharing of common resources, e.g., power supplies, cooling systems, enclosures, etc., and the reduction of space required by this type of multi-server system while providing a significant increase in available computer processing power.

SUMMARY

An information handling system may be comprised of blade server modules (BSMs), and each BSM may be an independent device module. The BSMs may be coupled to the one or more PSUs through a power distribution board (PDB). In addition, there may be at least one module monitor board (MMB) associated with the BSMs and PSUs for control and monitoring purposes. There exists a problem in a multi-blade server information handling system wherein the PSUs will shut down and thus all of the BSMs will not have operating power to function when no MMB is functional in the information handling system, e.g., during failure, repair and/or replacement thereof. This will cause a negative impact for the information handling system user because of server down time.

According to a specific example embodiment of this disclosure, logic within each PSU may be used to store system operating requirements without a continuous functional connection to an MMB. By using a PS_ON control signal and/or a control signal from an $I^2C$ device, the desired operational condition for each of the PSUs may be stored within the respective PSU and that condition may be maintained whether or not a control signal from an MMB is present. The MMB may turn on or off a PSU with either the PS_ON control signal or the $I^2C$ device.

By utilizing the $I^2C$ device and/or the PS_ON control signal, the PSUs may store the most recent power control command written, and thus will continue to maintain that condition (e.g., supplying power) even though the PS_ON control signal may go high (due to a pull-up resistor on the PS_ON input of the PSU) when the MMBs have been removed.

The ability to control a PSU with the PS_ON control signal and/or a control signal from the $I^2C$ device allows compatible operation with existing PSUs (using only the PS_ON control signal) and substantially no increase in hardware costs since the $I^2C$ device typically is a standard component in a PSU. An advantage of being able to control the PSU with the PS_ON control signal and/or the $I^2C$ device in the PSU allows greater flexibility in testing and/or repairing a PSU on a production line and/or service center. A PS_KILL signal may be utilized for distinguishing between a desired PSU turn-off by the PS_ON control signal versus a pull-out of the MMBs from system card slots.

BRIEF DESCRIPTION OF THE DRAWINGS

A more complete understanding of the present disclosure and advantages thereof may be acquired by referring to the following description taken in conjunction with the accompanying drawings wherein.

Figure 1:
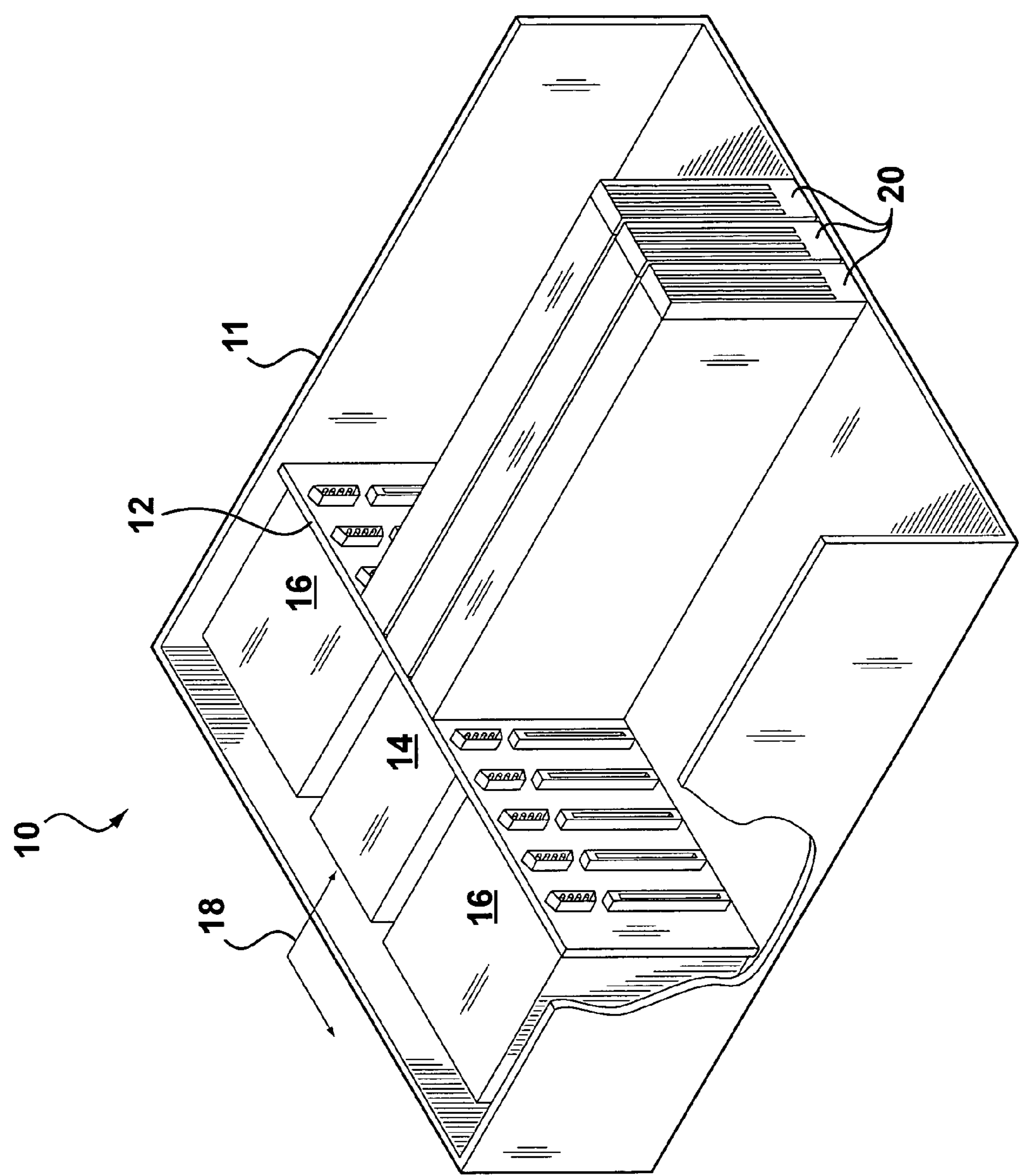
FIG. 1 is a schematic perspective view of an information handling server system, according to a specific example embodiment of the present disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of specific example embodiments of the present invention are schematically illustrated. Like elements in the drawings will be represented by like numbers, and similar elements will be represented by like numbers with a different lower case letter suffix.

Referring to FIG. 1, depicted is a schematic perspective view of an information handling server system, according to a specific example embodiment of the present disclosure. The information handling server system, generally represented by the numeral 10, comprises at least one server module 20, a power distribution board (PDB) 12, at least one power supply unit (PSU) 14 and two module monitor boards (MMBs) 16. In certain embodiments, one example of an information handling server system 10 includes a high density server system 10 that may form a part of a component rack system (not expressly shown). Typically, the high density server system 10 may include an enclosure or chassis 11 in which the at least one PSU 14, MMBs 16, mid-plane 12, and the at least one server module 20 may be enclosed therein.

Although FIG. 1 depicts mid-plane 12 as being placed between MMBs 16, and the at least one server module 20, the PDB 12 may be located anywhere in the information handling system 10, even external to the chassis 11. In alternate embodiments, PDB 12 may be located along the back of the information handling server system 10 and may be referred to as a power distribution back-plane (not shown).

Typically, the information handling system 10 may include more than one PSU 14 such that a redundant power source may be provided. The PSU 14 may supply a power supply output, e.g., an electrical voltage(s) for each of the server modules 20. Generally, the PSU 14 output (described below in more detail) connects through the PDB 12 for distribution to each of the at least one server module 20.

Figure 2:
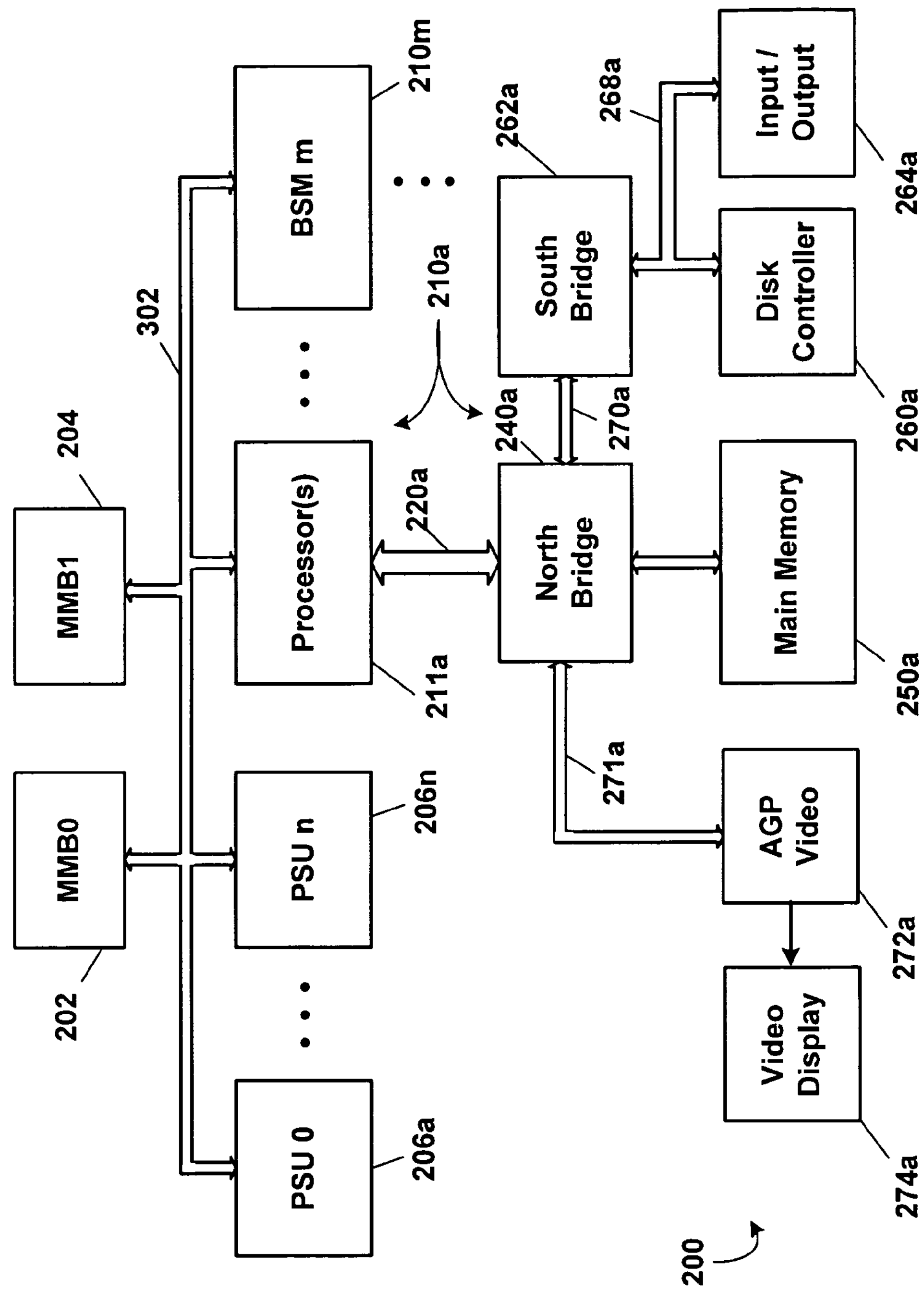
FIG. 2 is a schematic block diagram of an information handling server system, according to a specific example embodiment of the present disclosure.

Referring to FIG. 2, depicted is an information handling server system having electronic components mounted on at least one printed circuit board (PCB) (motherboard) and communicating data and control signals therebetween over signal buses. In one example embodiment, the information handling server system is a computer blade server system. The information handling server system, generally referenced by the numeral 200, comprises a plurality of blade server modules (BSMs) **210*a*-210*m*. For each of the blade server modules (BSMs) 210*a*-210*m* (for illustrative purposes only components for BSM 210*a* are shown) there may be a processor(s) 211*a*, a north bridge 240*a*, which may also be referred to as a memory controller hub or a memory controller, and is coupled to a main system memory 250*a*. The north bridge 240*a* is coupled to the processor(s) 210*a* via the host bus 220*a*. The north bridge 240*a* is generally considered an application specific chip set that provides connectivity to various buses, and integrates other system functions such as a memory interface. For example, an Intel 820E and/or 815E chip set, available from the Intel Corporation of Santa Clara, Calif., provides at least a portion of the north bridge 240*a*. The chip set may also be packaged as an application specific integrated circuit (ASIC). The north bridge 240*a* typically includes functionality to couple the main system memory 250*a* to other devices within the information handling system 10. Thus, memory controller functions such as main memory control functions typically reside in the north bridge 240*a*. In addition, the north bridge 240*a* provides bus control to handle transfers between the host bus 220*a* and a second bus(es), e.g., PCI bus 270*a*, AGP bus 271 a that may he coupled to a video graphics interface 272*a* which is adapted to drive a video display 274*a*. A third bus(es) 268*a* may also comprise other industry standard buses or proprietary buses, e.g., ISA, SCSI, $I^2C$, SPI, USB buses through a south bridge(s) (bus interface) 262*a***.

Figure 3:
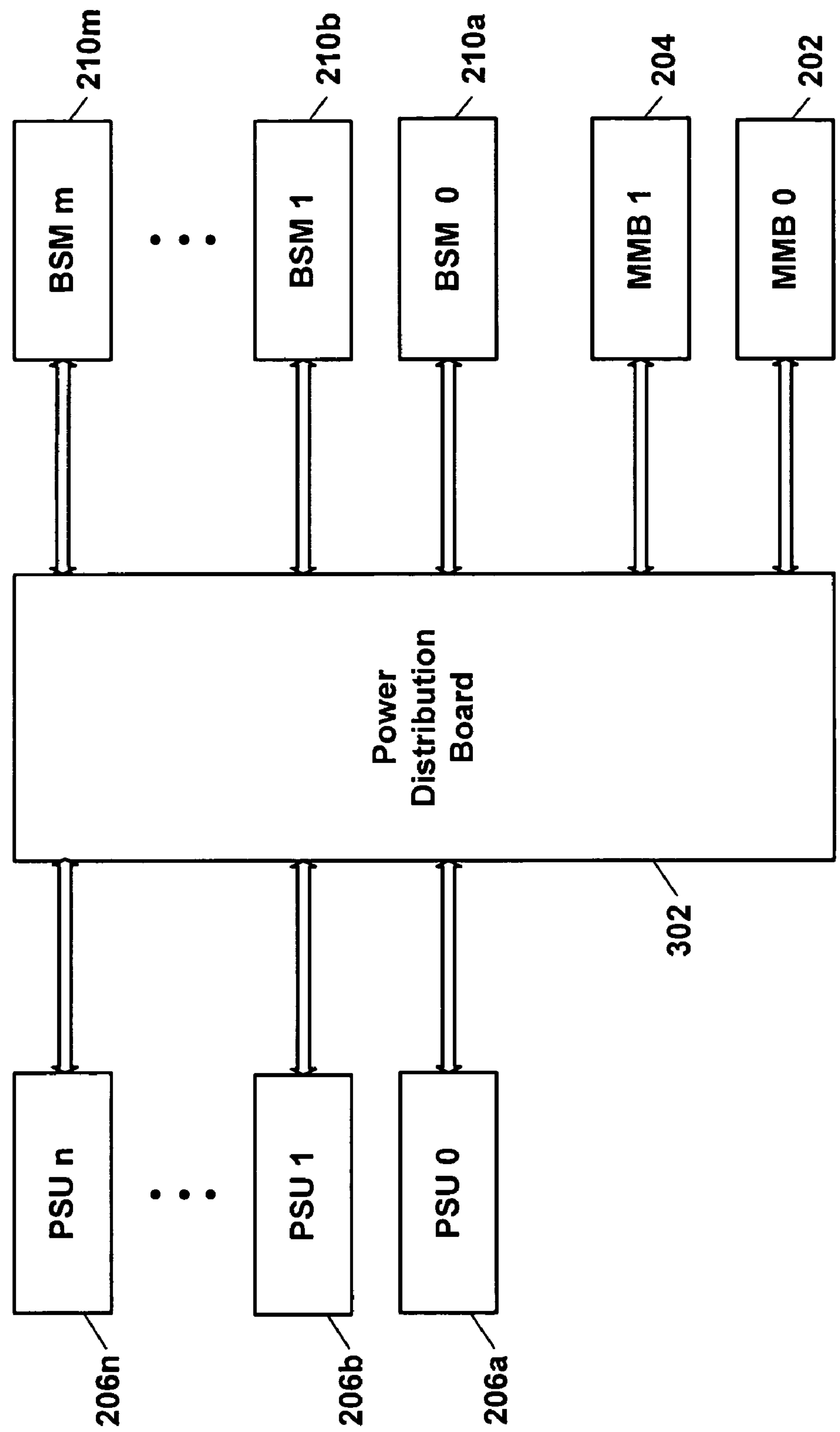
FIG. 3 is a schematic block diagram of a power distribution system of an information handling server system, according to a specific example embodiment of the present disclosure.

FIG. 3 is a schematic block diagram of a power distribution system of an information handling server system, according to a specific example embodiment of the present disclosure. A plurality of power supply units (PSUs) **206*a*-206*n* are coupled to a plurality of blade servers 210*a*-210*m* through a power distribution board 302. Two module monitor boards (MMBs) 202 and 204 may monitor and control the PSUs 206**.

Figure 4:
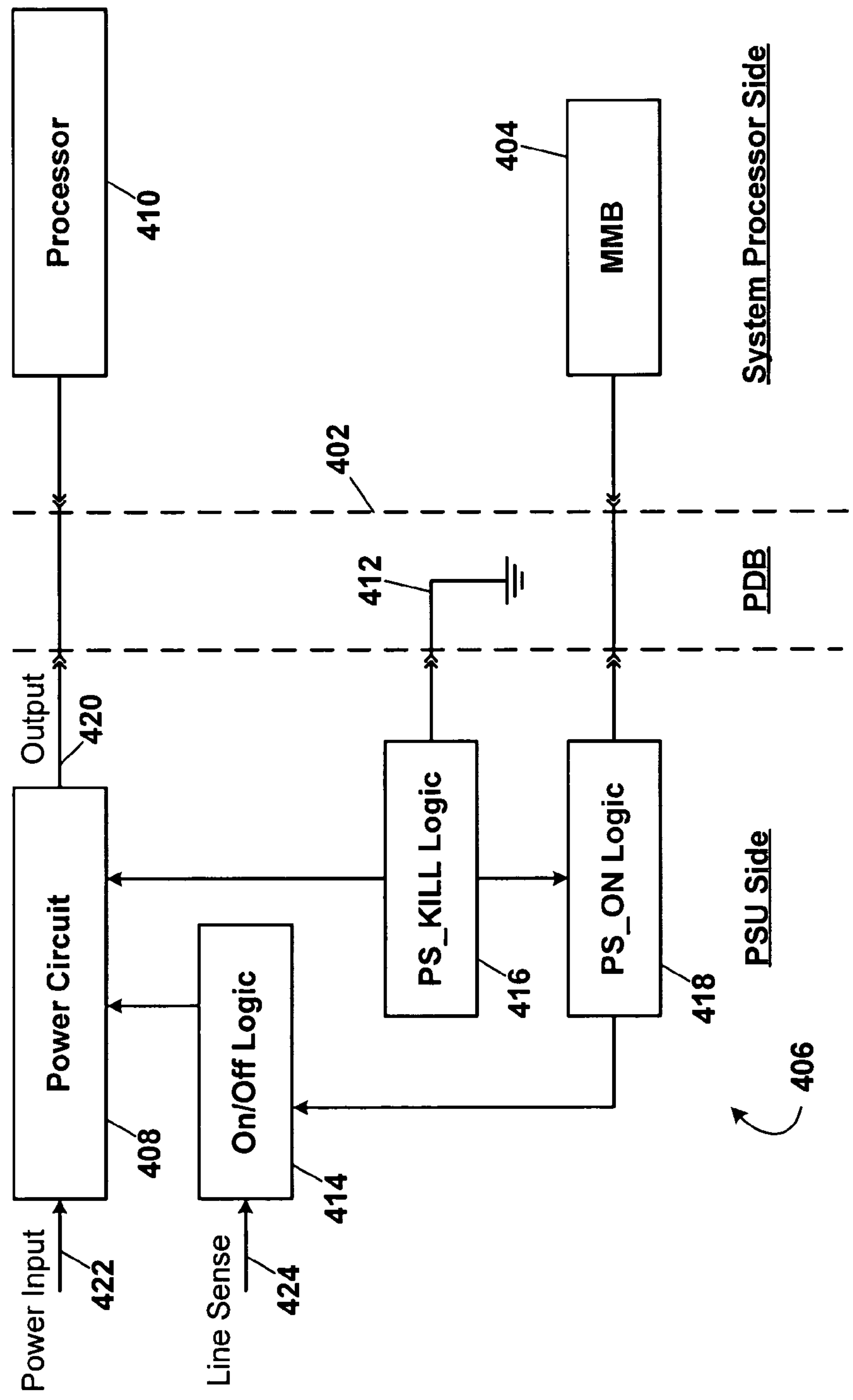
FIG. 4 is a schematic block diagram of a prior art power supply unit control system.

Referring to FIG. 4, depicted is a schematic block diagram of a prior art power supply unit control system. A processor 410 may be powered from a power supply unit (PSU) 406 through a power distribution board (PDB) 402. A module monitor board (MMB) 404 (two may be present in an information handling system) monitors and controls the PSU 406. The processor 410, MMB 404 and PSU 406 are adapted to plug into the PDB 402.

The PSU 406 may comprise a power circuit 408, on/off logic 414, power supply kill logic 416 and power supply on logic 418. Power from a utility power source or battery back-up system (e.g., uninterruptible power supply-UPS) may be applied at a power input 422 of the power circuit 408. The power circuit 408 converts the utility power voltage to voltages required by the processor 410. These processor voltages are coupled to the PDB 402 at output 420 of the power circuit 408 and distributed through the PDB 402 to the processor 410.

The PSU 406 is adapted to be plugged into and unplugged from the PDB 402 so that it may be easily removed for servicing thereof and then re-installed. These service removal and insertion replacement operations may be performed while the information handling system remains operational so long as at least one PSU 406, processor 410 and MMB 404 are present and operational.

The power circuit 408 of the PSU 406 may be manually turned on and off through the on/off logic 414 by a signal on a line sense 424. The power circuit 408 may also be turned on and off by the PS_ON logic 418 that may be controlled by the MMB 404. A PS_KILL logic 416 will turn off the power circuit 408 when the PSU 406 is unplugged from the PDB 402 by interrupting the ground contact 412. There exists a problem, however, when there is no operational MMB 404. Even though the PSUs 406 and processors 410 may be capable of redundant sharing, when no functional MMB 404 exists then the PSU 406 ceases to operate thus the entire information handling system shuts down. Therefore, the MMB 404 is a weak link in maintaining high levels of availability of the information handling system.

Figure 5:
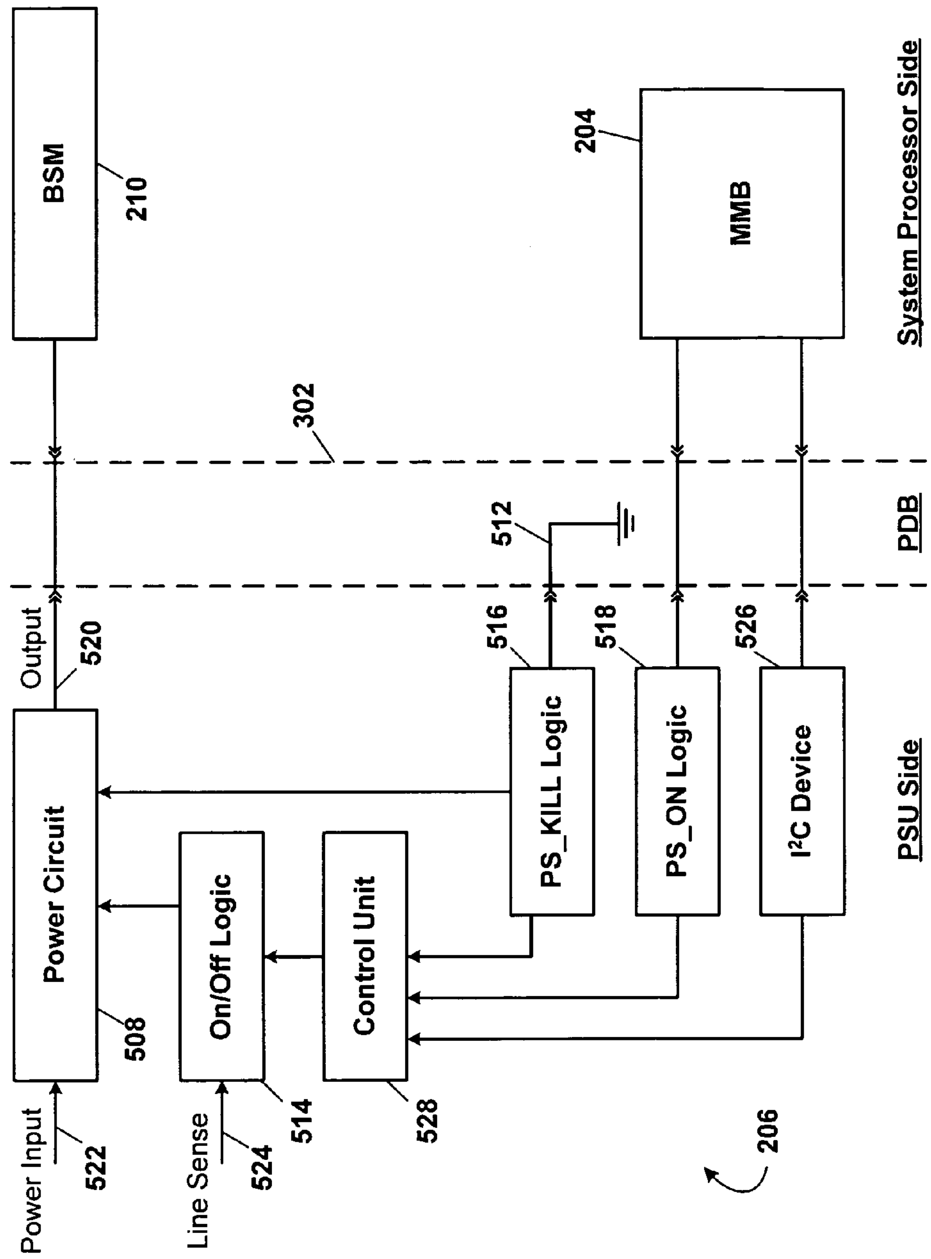
FIG. 5 is a schematic block diagram of a power supply unit control system, according to a specific example embodiment of the present disclosure.

Referring to FIG. 5, depicted is a schematic block diagram of a power supply unit control system, according to a specific example embodiment of the present disclosure. A blade server module (BSM) 210 may be powered from a power supply unit (PSU) 206 through a power distribution board (PDB) 302. A module monitor board (MMB) 204 (two may be present in an information handling server system) may monitor and control the PSU 206. The BSM 210, MMB 204 and PSU 206 may be adapted to plug into the PDB 302.

The PSU 206 may comprise a power circuit 508, on/off logic 514, power supply kill logic 516, power supply on logic 518, an $I^2C$ device 526 and control logic 528. Power from a utility power source or battery back-up system (e.g., uninterruptible power supply-UPS) may be applied at a power input 522 of the power circuit 508. The power circuit 508 converts the utility power voltage to voltages required by the BSM 210. These voltages are coupled to the PDB 302 at output 520 of the power circuit 508 and distributed through the PDB 302 to the BSM 210.

The power circuit 508 of the PSU 206 may be manually turned on or off through the on/off logic 514 by a signal on a line sense 524. The power circuit 508 may also be turned on and off by the control logic 528. The PS_KILL logic 516 turns off the power circuit 508 when the PSU 506 is withdrawn from connection with the PDB 302 by interrupting the ground contact 512.

The control logic 528 may also send a signal to instruct the on/off logic 514 to turn on or off the power circuit 508 of the PSU 206. An "ON" control signal from the PS_ON logic 518 and/or the $I^2C$ device 526 will cause the control logic 528 to turn on the power circuit 508. Since the $I^2C$ device 526 has memory, a PSU_ON command from the MMB 204 to the $I^2C$ device 526 will be retained therein. Thus, the MMB 204 may be removed and/or fail, and not cause the PSU 506 to shutdown for lack of a maintained on signal.

By utilizing the $I^2C$ device 526, the most recent power control command written the $I^2C$ device 526 may be stored and thus the $I^2C$ device 526 will continue to maintain that condition (e.g., power on) even when all of the MMBs have been removed and/or have failed. The $I^2C$ device 526 may be an existing $I^2C$ device also used for other purposes in the PSU 206.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. An information handing system having a power supply with operating command memory, said system comprising:

at least one power supply unit having operating command memory for storing a most recent operating command;

at least one server module;

a power distribution board; and at least one module monitor board, wherein the at least one power supply unit, the at least one server module and the at least one module monitor board are coupled together through the power distribution board, and whereby the at least one power supply unit continues to function at the most recent operating command when the at least one module monitor board fails or is decoupled from the power distribution board.

2. The information handing system according to claim 1, wherein the at least one module monitor board issues the most recent operating command.

3. The information handing system according to claim 1, wherein the at least one power supply unit comprises:

a power circuit for supplying operating power to the at least one server module;

on/off control logic for controlling the power circuit supplying power to the at least one server module; and a control device having memory storage, wherein the on/off control logic has a first control input coupled to a first control output of the at least one module monitor board and a second control input coupled to the control device having memory storage, whereby the control device having memory storage retains the most recent operating command from the at least one module monitor board.

4. The information handing system according to claim 3, wherein the first control input controls operation of the on/off control logic.

5. The information handing system according to claim 3, wherein the second control input controls operation of the on/off control logic.

6. The information handing system according to claim 3, wherein the first and second control inputs control operation of the on/off control logic.

7. The information handing system according to claim 3, wherein the control device having memory storage is an $I^2C$ controller device.

8. The information handing system according to claim 3, further comprising a power supply kill logic for turning off the power circuit when the at least one power supply unit is decoupled from the power distribution board.

9. The information handing system according to claim 8, wherein the power supply kill logic turns off the power circuit when decoupled from a common connection on the power distribution board.

10. The information handing system according to claim 9, wherein the common connection is a ground connection.

11. The information handing system according to claim 3, wherein the power circuit has an input coupled to a power source.

12. The information handing system according to claim 1, wherein the at least one server module is at least one blade server module.

13. The information handing system according to claim 1, wherein the most recent operating command is a power on command.

14. The information handing system according to claim 1, wherein the most recent operating command is a power off command.

15. An information handing system having a power supply with operating command memory, said system comprising:

a plurality of power supply units, each one of the plurality of power supply units having an operating command memory for storing a most recent operating command;

a plurality of blade server modules;

a power distribution board; and at least two module monitor boards, wherein the plurality of power supply units, the plurality of blade server modules and the at least two module monitor boards are coupled together through the power distribution board, and whereby the plurality of power supply units continue to function at the most recent operating commands stored in the operating command memories when the at least two module monitor boards both fail or are both decoupled from the power distribution board.

16. The information handing system according to claim 15, wherein at least one of the at least two module monitor boards issues the most recent operating commands.

17. The information handing system according to claim 15, wherein each of the plurality of power supply units comprises:

a power circuit for supplying operating power for distribution to the plurality of blade server modules;

on/off control logic for controlling the power circuit supplying power to the at least one server module; and a control device having memory storage, wherein the on/off control logic has a first control input coupled to a first control output of the at least one module monitor board and a second control input coupled to the control device having memory storage, whereby the control device having memory storage retains the most recent operating command from the at least one module monitor board.

18. The information handing system according to claim 17, wherein the first control input controls operation of the on/off control logic.

19. The information handing system according to claim 17, wherein the second control input controls operation of the on/off control logic.

20. The information handing system according to claim 17, wherein the first and second control inputs control operation of the on/off control logic.

21. The information handing system according to claim 17, wherein the control device having memory storage is an $I^2C$ controller device.

22. The information handing system according to claim 17, further comprising a power supply kill logic for turning off the power circuit when the at least one power supply unit is decoupled from the power distribution board.

23. The information handing system according to claim 22, wherein the power supply kill logic turns off the power circuit when decoupled from a common connection on the power distribution board.

24. The information handing system according to claim 23, wherein the common connection is a ground connection.

25. The information handing system according to claim 17, wherein the power circuit has an input coupled to a power source.

26. A power supply, comprising:

a power circuit adapted for supplying operating power to a server module;

on/off control logic for controlling the power circuit; and a control device having memory storage, wherein the on/off control logic has a first control input adapted for coupling to a first control output of a module monitor board arid a second control input coupled to the control device having memory storage, whereby the control device having memory storage retains a most recent operating command from the module monitor board.

27. The power supply according to claim 26, wherein the first control input controls operation of the on/off control logic.

28. The power supply according to claim 26, wherein the second control input controls operation of the on/off control logic.

29. The power supply according to claim 26, wherein the first and second control inputs control operation of the on/off control logic.

30. The power supply according to claim 26, wherein the control device having memory storage is an $I^2C$ controller device.

31. The information handing system according to claim 26, wherein the most recent operating command is a power on command.

32. The information handing system according to claim 26, wherein the most recent operating command is a power off command.

* * * * *